(12) United States Patent
So et al.

(10) Patent No.: US 9,490,079 B2
(45) Date of Patent: Nov. 8, 2016

(54) ELECTROCHEMICAL ENERGY STORAGE DEVICE WITH FLEXIBLE METAL CONTACT CURRENT COLLECTOR AND METHODS OF MANUFACTURE

(71) Applicant: COOPER TECHNOLOGIES COMPANY, Houston, TX (US)

(72) Inventors: Peter York So, Danville, CA (US); Chad David Johns, San Leandro, CA (US); Kyle Yun-Su Kim, Manteca, CA (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 235 days.

(21) Appl. No.: 14/229,370

(22) Filed: Mar. 28, 2014

(65) Prior Publication Data

US 2015/0279574 A1    Oct. 1, 2015

(51) Int. Cl.
| | |
|---|---|
| H01G 11/70 | (2013.01) |
| H01G 11/04 | (2013.01) |
| H01G 11/80 | (2013.01) |
| H01G 11/82 | (2013.01) |
| H01M 2/04 | (2006.01) |
| H01M 2/26 | (2006.01) |
| H01G 11/28 | (2013.01) |
| H01G 11/56 | (2013.01) |
| H01G 11/78 | (2013.01) |

(Continued)

(52) U.S. Cl.
CPC .............. *H01G 11/04* (2013.01); *H01G 11/28* (2013.01); *H01G 11/56* (2013.01); *H01G 11/70* (2013.01); *H01G 11/74* (2013.01); *H01G 11/78* (2013.01); *H01G 11/80* (2013.01); *H01G 11/82* (2013.01); *H01M 2/0413* (2013.01); *H01M 2/263* (2013.01); *H01M 10/0422* (2013.01); *H01M 10/0431* (2013.01); *Y02E 60/13* (2013.01)

(58) Field of Classification Search
CPC ...... H01G 11/82; H01G 11/84; H01G 11/78; H01G 9/155; H01G 11/28; H01G 11/70; H01G 11/74; H01G 9/06; H01G 9/08; H01G 9/016; H01G 11/66; H01G 9/151; H01G 11/68; H01G 11/72
See application file for complete search history.

(56) References Cited

U.S. PATENT DOCUMENTS

| | | |
|---|---|---|
| 6,222,720 B1 | 4/2001 | Aoki et al. |
| 6,813,139 B2 | 11/2004 | Bendale et al. |

(Continued)

FOREIGN PATENT DOCUMENTS

| | | |
|---|---|---|
| JP | 2001256954 | 9/2001 |
| JP | 2011054380 | 3/2011 |
| JP | 2013012335 A | 1/2013 |

OTHER PUBLICATIONS

Extended European Search Report for Application No. 15160880.9, Oct. 19, 2015, 7 pages.

(Continued)

*Primary Examiner* — Dion R Ferguson
(74) *Attorney, Agent, or Firm* — Armstrong Teasdale LLP (57) ABSTRACT

Electrochemical energy storage devices such as electric double layer capacitors include flexible metal contact current collectors establishing electrical contact with a conductive housing and a conductive cover. The flexible current collector simplifies manufacturing of the device and avoids laser welding on the conductive housing. The manufacture devices are operable with a reduced direct current resistance by virtue of the flexible current collector.

44 Claims, 6 Drawing Sheets

(51) Int. Cl.
*H01G 11/74* (2013.01)
*H01M 10/04* (2006.01)

(56) References Cited

U.S. PATENT DOCUMENTS

| | | |
|---|---|---|
| 7,542,266 B2 | 6/2009 | Kim |
| 7,976,979 B2 | 7/2011 | Kozuki et al. |
| 8,098,481 B2 | 1/2012 | Zong et al. |
| 8,537,526 B2 | 9/2013 | Shimizu |
| 2005/0048365 A1 | 3/2005 | Miyahisa et al. |
| 2014/0254065 A1* | 9/2014 | Rustomji ............... H01G 11/82 361/502 |
| 2014/0308554 A1* | 10/2014 | Khakhalev ............. H01G 9/048 429/94 |
| 2015/0143680 A1* | 5/2015 | Krug ..................... H01G 11/28 29/25.41 |

OTHER PUBLICATIONS

U.S. Appl. No. 13/787,048, filed Mar. 6, 2013.

* cited by examiner

ELECTROCHEMICAL ENERGY STORAGE DEVICE WITH FLEXIBLE METAL CONTACT CURRENT COLLECTOR AND METHODS OF MANUFACTURE

BACKGROUND OF THE INVENTION

The field of the invention relates generally to electrochemical energy storage devices, and more specifically to electric double layer capacitor (EDLC) devices.

In electrical systems, secondary sources of current make it possible to accumulate, store and release electric power to an external electric circuit. Among these secondary sources are conventional batteries, conventional capacitors and electrochemical capacitors. Known devices of this kind include energy storage elements inside housings filled with electrolyte, and terminals for connecting the energy storage element to an electrical circuit. In the manufacture of such devices, establishing electrical connections to the energy storage elements can be problematic in some aspects, and improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Modern electrochemical energy storage devices, including but not limited to electric double layer capacitor (EDLC) devices, generally include a housing, sometimes referred to as a can, and at least one energy storage cell in the can. Terminals are also provided for connecting the energy storage cell of the device to external electrical circuitry.

Electrochemical double layer capacitors (EDLCs) utilize two high surface area electrodes and store energy in an electrostatic field between ions in an electrolyte solution and electrons on surface of the electrodes. Such devices commonly use liquid phase electrolyte, so containing the electrolyte in the housing, as well as preventing contamination from the outside environment, is critical for the devices to function properly and to maximize their operating life. Therefore, providing a properly sealed container for the system is important to the construction of EDLC devices.

Because of the electrostatic nature of the electrodes, EDLCs may be charged and discharged very quickly. Typically, the limiting factor in charge/discharge rates and efficiency of EDLCs is the electrical connections between the electrodes to the positive and negative terminals of the device. Not only are such electrical connections difficult to establish in the first place, they tend to result in relatively high resistance that tends to increase the direct current resistance (DCR) of the ELDC device. As higher DCR negatively impacts the performance of the ELDC device, reducing DCR of such devices is desired, but conventionally has been difficult to accomplish reliably and effectively.

In certain types of EDLC devices, the positive and negative electrodes of the storage cell are commonly wound into a layered, cylindrical package often referred to a jelly roll package, that also includes separator elements to provide one or more energy storage cells in a compact package. The jelly roll package is assembled with a housing, sometimes referred to as a can in the art, and the jelly roll is then impregnated with an electrolyte solution inside the housing for use. One or more current collectors are also provided to establish electrical connection between the positive and negative electrodes of the jelly roll and the positive and negative terminals of the device providing circuit connections to external electrical circuitry.

In one known EDLC construction, the positive or negative terminals of the ELDC device may be connected to tabs of connector plates that are, in turned joined to one or more of the respective positive or negative electrodes of the jelly roll. In EDLC devices of this kind, a plurality of connector tabs are typically joined by cold welding into the shape of the electrode or are directly cut into the shape of the electrode. One or more connector tabs may be provided for each respective positive or negative electrode in the jelly roll. The connector tabs are typically oriented in the same direction relative to the jelly roll to make connection to the positive or negative terminals of the EDLC device simple. Assembling the connector tabs in the proper shape and establishing connections to the electrodes is, however, a tedious task and can result in a relatively complicated and expensive construction of the EDLC device. This type of construction also tends to result in increased, rather than decreased, DCR for manufactured devices.

In devices of the type described above, the metal housing or can, once the jelly roll and the electrodes are assembled therein, may be closed with a nonconductive cover fabricated from plastic and including a conductive terminal embedded therein. A rubber or polymer bung or gasket, for example, may extend around a periphery of the cover and the can may be crimped into the rubber or polymer to seal the connection of the can and cover. For small devices, the cover may be omitted and small holes may be provided through the bung, and terminal leads connecting to the jelly roll may extend through the holes. The can may be deformed to compress the bung and seal the assembly. Such approaches can present reliability issues due to incomplete seals, and limited electrical contact with the electrodes can affect performance of the devices in use.

In other types of known EDLC constructions, the jelly roll may include offset electrodes such that a bare metal surface is exposed on either end of the jelly roll to expose each respective end of an electrode. The exposed metal surface may be crushed to create a flat surface on the end of the jelly roll, which then can then be connected, via a known laser welding process in one example, to a flat collector plate. After being welded to the jelly roll, the connector plate is then commonly connected, via a known laser welding process in one example, to the can of the EDLC either through the can or through the back side of the can. The welding of the current collector to the can effectively makes the can one of the current collectors in the device. This construction is simpler in some aspects to the connector tab construction described above, and may provide devices having reduced DCR, but is not without its drawbacks.

Specifically, laser welding of the collector plate to the can is a difficult step in the manufacture to reliably complete. If the welding is deficient or defective, the collector plate may wholly or partially separate from the can and present reliability issues and performance variations in manufactured devices. Deficient or defective welding may also create a void in the constructed device through which air may get into the device or from which electrolyte may escape, also presenting reliability issues and performance variations in manufactured devices. Laser welding a current collector plate directly to the can also is also potentially problematic when the manufactured device is subject to vibration or shock in use, as an otherwise acceptable welded joint may be compromised by the shock and vibration while the device is operating. The device and related circuitry may be negatively compromised if and when this occurs.

In the type of device described above, a conductive cover may be coupled to the opposite side of the jelly roll than is laser welded to the can, with a nonconductive plastic film, for example, providing electrical isolation between the conductive can and the conductive cover. The can may then be crimped to seal the assembly. O-ring seals or gaskets may also be provided to improve the sealing of the cover and can. Such approaches can present reliability issues, however, due to incomplete seals Exemplary embodiments of electrochemical energy storage devices are described hereinbelow that overcome these and other disadvantages in the art. Specifically, exemplary embodiments of electrochemical energy storage devices, including but not necessarily limited to EDLC devices, are described that may be manufactured relatively simply in a cost effective manner, while avoiding welding of collector plate on the inside of the device to the outer can of the device and its accompanying drawbacks and also while providing improved sealing of the devices. Method aspects will be in part explicitly discussed and in part apparent from the description below. Also, while described in the context of an EDLC device, the concepts described below may be applied to other types of energy storage devices, including but not limited to battery devices.

Figure 1:
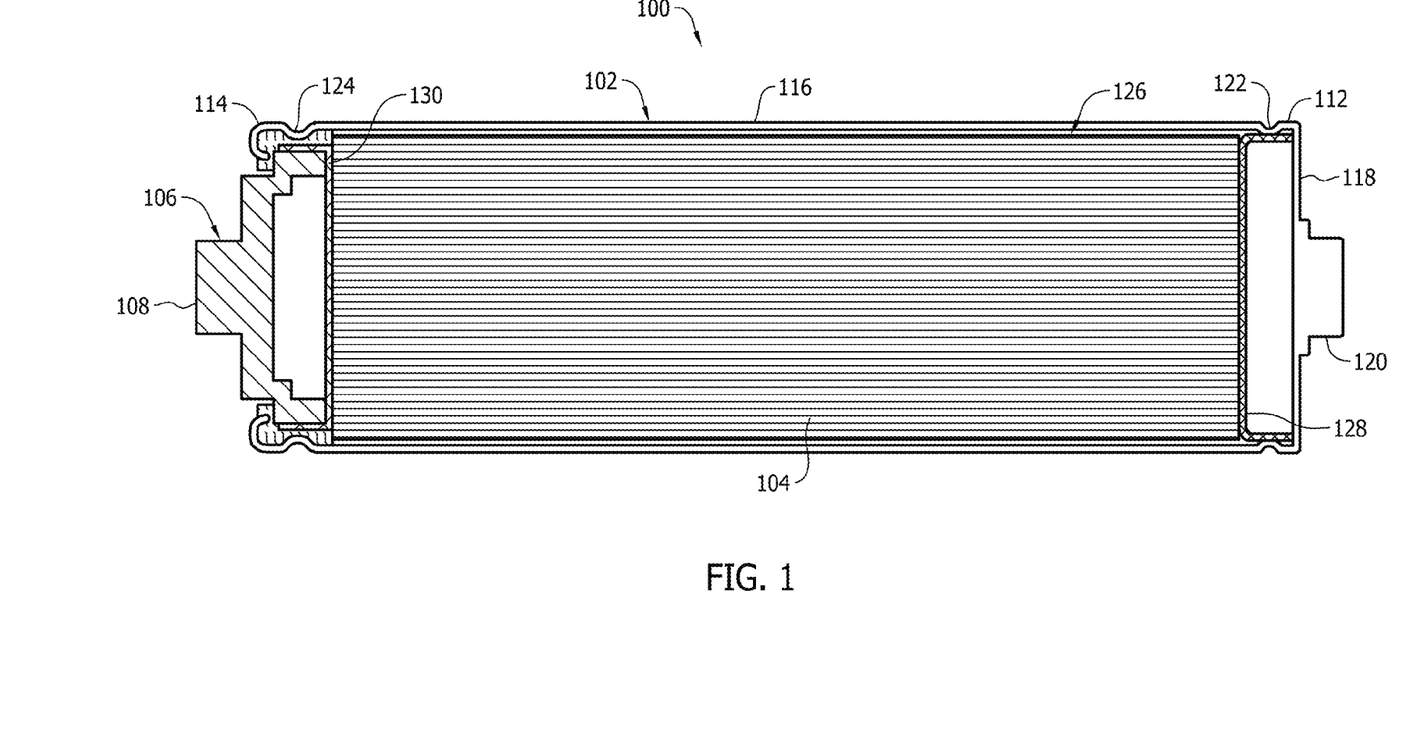
FIG. 1 is a sectional view of an exemplary embodiment of an electrochemical energy storage device.

FIG. 1 illustrates an exemplary embodiment of an electrochemical energy storage device 100 including a housing 102, and at least one energy storage element 104 in the housing 102. When the housing 102 is filled with an electrolyte to impregnate the storage element 104, the storage element 104 is operable to store and release electrical energy to and from an external electrical circuit. The device 100 also includes a cover 106 coupled to the housing 102.

The cover 106 in contemplated embodiments is fabricated from an electrically conductive material and includes a metal contact or terminal lug 108 formed therewith for establishing an electrical connection between an external electrical circuit and one side of the storage cell 104. The cover 106 is sealingly coupled to the housing 102, and also electrically isolated from the housing 102, as described below.

The housing 102 in the example depicted is a generally elongated cylindrical element having a first end 112, a second end 114 opposite the first end 112, and a cylindrical sidewall 116 extending between the first end 112 and the second end 114. The first end 114 in the example shown includes an end wall 118 that is generally flat and planar and includes a metal contact or terminal lug 120 for connection to an electrical circuit. The second end 114 is formed with an opened end that is attached to the cover 106 as described below. The sidewall 116 between the first and second ends 112, 114 is generally round in cross section and has a constant diameter for most of its axial length measured between the first and second ends 112, 114.

The housing 102 includes a restricted or indented section 122, 124 at each respective end 112, 114. The restricted section 122 facilitates electrical contact with the energy storage element 104 and the housing 102 as explained further below, while the restricted section 124 facilitates a connection of the cover 106 and sealing of the storage element 104. The storage element 104 extends in a receptacle 126 in the housing 102 defined between the housing first end 112, the sidewall 116 and the cover 106. The housing 102 in exemplary embodiments may be formed from metal, such as steel or aluminum in exemplary embodiments, using known techniques. The housing 102 is often referred to as a can. In contemplated embodiments, the can 102 is fabricated from metal, including but not limited to steel or aluminum, in a known manner. The restricted or indented sections 122, 124 may be formed in a known manner after the component parts of the device 100 are assembled as explained below.

In one contemplated embodiment, the device 100 is an EDLC device, sometimes referred to as a supercapacitor that has, for example, specific capacitance of greater than 100 F/g, as opposed to conventional capacitors with specific capacitance on the order of only several F/g. Supercapacitors are used in a variety of different applications such as memory backup to bridge short power interruptions, battery management applications to improve the current handling of a battery, or to provide a current boost on high load demands.

The at least one storage element 104, sometimes referred to as a storage cell, of the ELDC device 100 is situated internal to the receptacle 126 defined by the housing 102. As the device 100 is manufactured, the storage cell 104 is filled with an electrolyte and the storage cell 104 includes at least one positive electrode (cathode), at least one negative electrode (anode), and a separator such as a membrane that separates the anode space from the cathode space. In a contemplated embodiment, the jelly roll storage cell 104 includes offset electrodes that may be crushed to create a flat surface on end thereof.

The storage cell 104 including the positive and negative electrodes may be provided as a generally tubular or cylindrical jelly roll package having multiple layers that define a single cell or multiple cells. It is recognized that a jelly roll may alternatively be provided in other shapes and configurations, including but not limited to folded configurations and accordion shapes if desired. A first current collector 128 may be provided to the jelly roll storage cell 104 at one end and a second current collector 130 may be provided to establish electrical connection to the jelly roll storage cell 104 at the opposing end. The current collectors 128 and 130 interconnect the electrodes(s) of the storage cell(s) 104 with the housing 102 and the cover 106. The current collector 128 mechanically and electrically engages the bottom end 112 of the housing 102 and a portion of the side wall 116 as described below to reliably establish electrical connection to the housing 102 without having to create a laser welded joint, and also while maintaining low electrical resistance and reduced DCR relative to conventional EDLC device constructions. The current collector 130 mechanically and electrically engages the cover 106 and completes electrical connections with the electrodes of the jelly roll storage cell 104 at the end 114 of the housing. In use, one of the terminal lugs 108, 126 provides respective electrical connection between the anode(s) of the storage cell(s) 104 and the other of the terminal lugs 108, 126 provides respective electrical connection between the cathode(s) of the energy storage cell(s) 104 and external electrical circuitry. It is recognized, however, that various other types and configurations of circuit connection terminals are known and likewise may be utilized in other embodiments.

The construction and operation of the storage cell 104 in the housing 102 of the EDLC device 100 is well understood and will not be detailed further herein.

The current collectors 128, 130 provide substantial benefits to the construction and manufacture of the device 100. Each current collector 128, 130 is fabricated from a flexible metal material into various shapes and geometries as described in the examples below.

Figure 2:
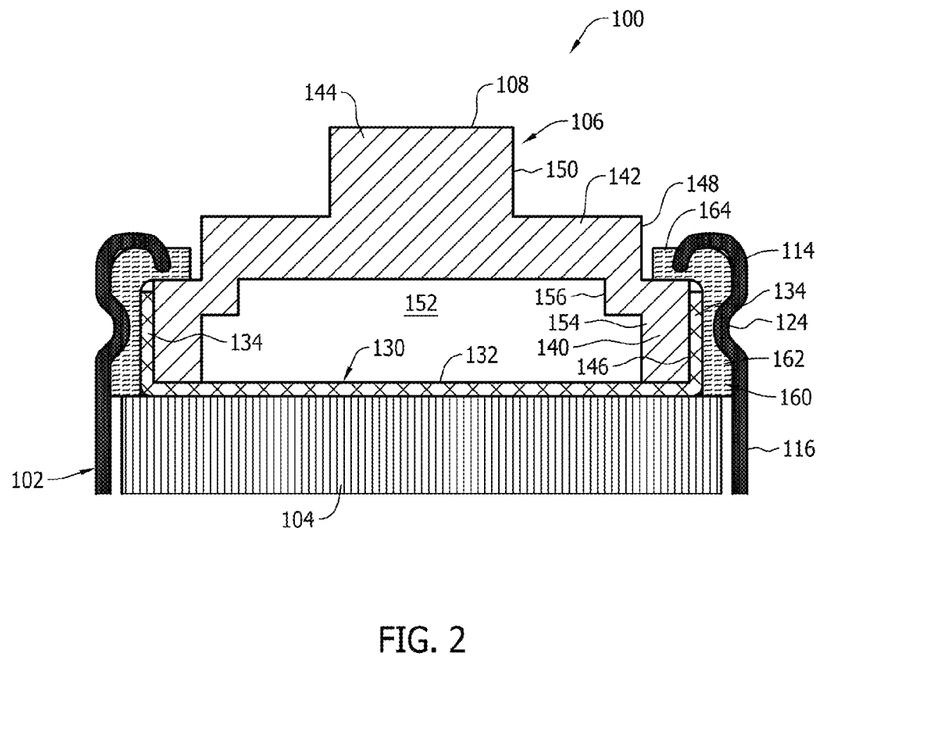
FIG. 2 is a magnified view of a first portion of the electrochemical energy storage device shown in FIG. 1.

As shown in the example of FIG. 2, the current collector 130 includes a generally flat and planar central body 132 and a flexible connector element 134 extending outwardly from a periphery of the body 132 and out of plane with respect to the body 132. The body 132 may be laser welded to the jelly roll storage element 104 either before the jelly roll storage element 104 is inserted into the housing 102 or before the housing end 114 is closed, and the connector element 134 may establish electrical connection with the cover 106 as described below. There is no laser welding needed or required from outside the housing 102 to complete the connection between the jelly roll storage element 104 and the cover 106. Issues such as those described above in relation to laser welding are therefore avoided.

The cover 106 in the example shown includes a first section 140 having a first outer diameter, a second section 142 having a second outer diameter, and a third section 144 having a third outer diameter. The first, second and third outer diameters of the cover 106 are progressively smaller such that the cover 106 has a stepped outer perimeter that culminates in the lug terminal 108. That is, first section 140 of the cover 106 has a first outer surface 146 having the third and largest outer diameter, the second section of the cover 142 has a second outer surface 148 having the second and intermediate outer diameter, and the third section 144 of the cover has a third outer surface 150 having the third and smallest outer diameter.

In the example of FIGS. 1 and 2, the cover 106 is also formed to include a hollow interior cavity 152 having a first and larger inner diameter defined by a first interior surface 154 of the first cover section 142 and a second and smaller inner diameter defined by a second interior surface 156 of the first cover section 142. The second and third sections 142, 144 of the cover 106 are uniformly solid, however, and do not include internal openings or cavities. The interior cavity 152 in the cover 106 may in some embodiments be considered optional and may be omitted.

When assembled, an interior surface of the connecter element 134 of the collector 130 is in intimate contact with the outer surface 146 of the first cover section 140, and the body 132 of the current collector is in electrical contact with a facing end of the jelly roll storage element 104. A sealing element 160, sometimes referred to as a sealing member, surrounds an exterior surface of the connecter element 134 of the collector 130 and establishes a seal with the end 114 of the housing 102. The restricted or indented section 124 of the housing sidewall 116 compresses the seal element 160 and ensures electrical contact with between the connecter element 134 of the collector 130 and the outer surface 146 of the first section 140 of the cover 106. Because the current collector 130, including the connector element 134 is fabricated to be flexible, it may be easily applied to the cover 106 and/or may deform when compressed to ensure electrical connection with the cover 106. The distal end of the housing end 114 is crimped to the sealing element 160 as shown.

Figure 8:
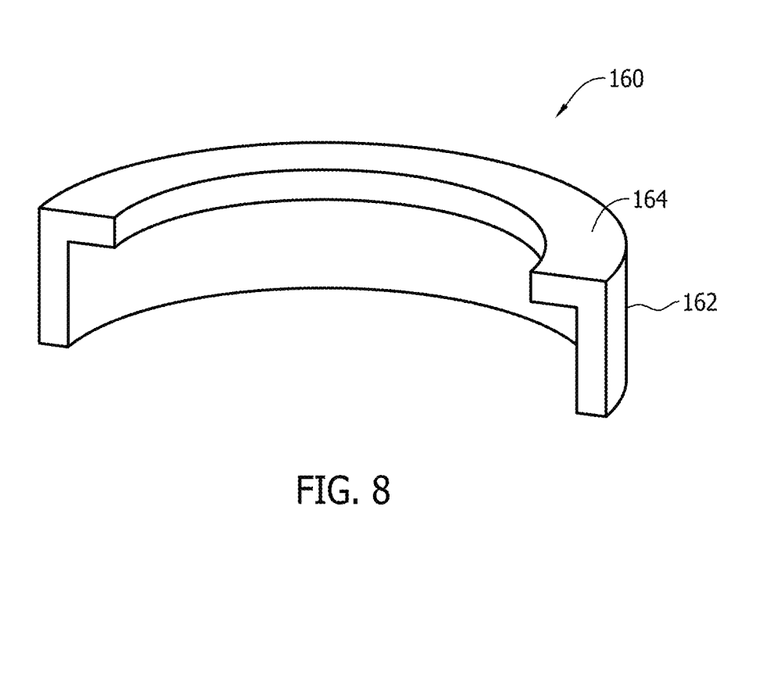
FIG. 8 is a first sectional view of a first exemplary embodiment of a sealing member for the electrochemical energy storage device shown in FIG. 1.

In the example shown in FIG. 2, the sealing element 160 includes a cylindrical wall portion 162 and an overhanding, annular ledge portion 164 extending perpendicularly to the wall portion 162. The wall portion 162 is formed with a first inner diameter that is about equal to the outer diameter of the connecter element 134 of the collector 130, and the ledge 164 extends radially inwardly from the outer diameter of the wall portion 162 at terminates at a second, and smaller, inner diameter. As seen in FIGS. 2 and 8, the sealing element 160 has an L-shaped cross section. When the device 100 is assembled, the ledge 164 overhangs the section 140 of the cover 146, and the second inner diameter of the ledge 164 is a bit larger than the outer diameter of the outer surface 148 of the cover section 142. Sealing is therefore provided not only around the outer periphery of the cover section 140, but over a portion of the upper surface of the cover section 140. Because the cover 106 is conductive in the exemplary embodiment, the sealing element 160 is fabricated from an electrically nonconductive material known in the art so that electrical isolation is provided between the cover 106 and the housing 102. In contemplated embodiments, the sealing element 160 may be fabricated, for example, from a known, electrically insulative elastomeric material that may be resiliently compressed against the outer surface of the cover 106 and/or the flexible current collector 130. Such compression of the sealing element may be accomplished, for example, when the restricted or indented section 124 is formed in the housing 102 at the end 114.

The assembly as shown in FIG. 2 including the flexible collector 130 and the sealing member 160 provides for device manufacture at relatively low cost with improved sealing relative to conventional fabrication methods for EDLC devices. Improved reliability of the seal is facilitated with an economical manufacture.

Figure 3:
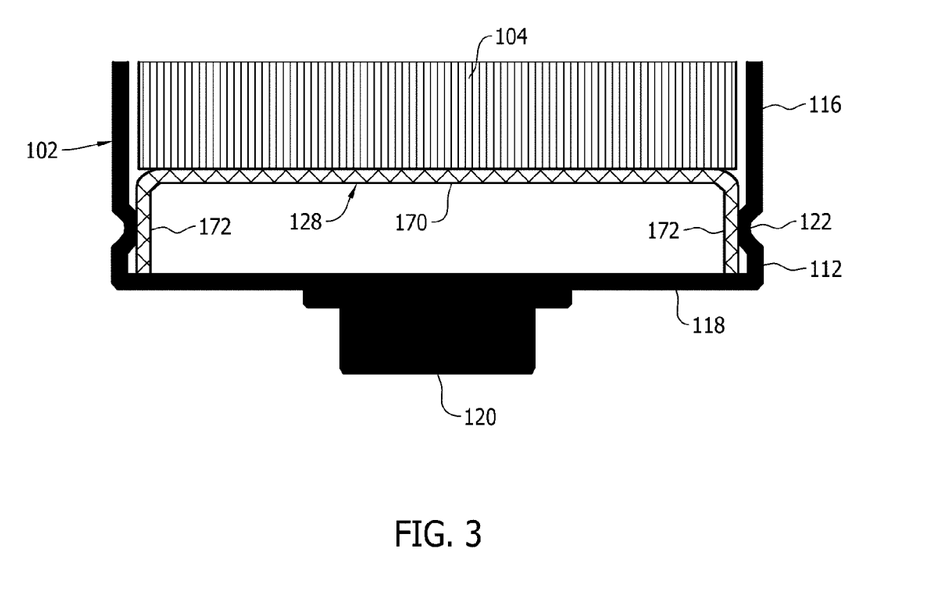
FIG. 3 is a magnified view of a second portion of the electrochemical energy storage device shown in FIG. 1.

As shown in the example of FIG. 3, the current collector 128 includes a generally flat and planar central body 170 and flexible connector element 172 extending outwardly from a periphery of the body 170 and out of plane with respect to the body 170. The body 170 may be laser welded to the jelly roll storage element 104 prior to its assembly with the housing 102, and the connector element 172 may establish electrical connection with the housing 102 when the jelly roll storage element 104 is inserted into the housing 102. The restricted section 122 of the housing end 112 may compress the connector element 172, and because the connector element 172 is flexible it may deform and enhance electrical contact between the collector 170 and the housing 102, whereby the housing 102 may operate as a current collector over a larger area for even greater performance of the energy storage cell 104.

By virtue of the current collector 128, electrical connection between one side of the jelly roll storage element 104 and the housing 102 is established without needing or utilizing a laser welded joint from the outside of the housing 102. Issues such as those described above in relation to laser welding are therefore avoided. Low electrical direct current resistance (DCR) is desirably facilitated while otherwise simplifying manufacturing operations and improving device reliability.

The flexible current collector 130 (FIG. 2) and the flexible current collector 128 (FIG. 3) at the opposing ends of the housing 102 may be configured as substantially identical parts having the same geometry or may be configured as different parts having different geometries. While exemplary geometries for the collectors 128, 130 are briefly described below, still other geometries are possible and may be utilized. Exemplary flexible current collectors are shown in FIGS. 4-7, any of which may be manufactured from thin electrical conductive materials such as metal or metal alloys according to known techniques. When fabricated from such materials into thin-walled pieces, the current collectors have desirable flexible properties that facilitate the assembly and advantages described above.

Figure 4:
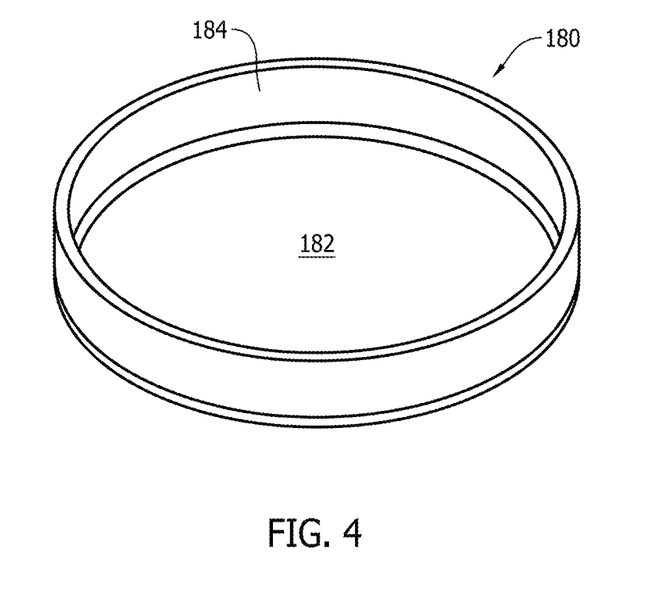
FIG. 4 is a perspective view of a first exemplary embodiment of a flexible current collector for the electrochemical energy storage device shown in FIG. 1.

FIG. 4 illustrates a first exemplary embodiment of a flexible current collector 180 that may be utilized as one or other or both of the current collectors 128, 130 (FIGS. 1-3) in the device 100 described above. The current collector 180 includes a generally flat and planar, disc-shaped body 182 extending in a first plane, and a connector element 184 extending as a cylindrical flange or rim that is out of plane to the body 182. In the example shown in FIG. 4, the connector element 184 extends as a right angle cylinder from the flat body 182, and in cross section the connector element 184 extends perpendicularly to the flat body 182. The flat body 182 in the example shown is solid and continuous and includes no internal openings, apertures, or holes extending through it. As such, when the current collector 180 is used as one of the collectors 128 or 130 the electrolyte solution cannot pass through the body 182.

Figure 5:
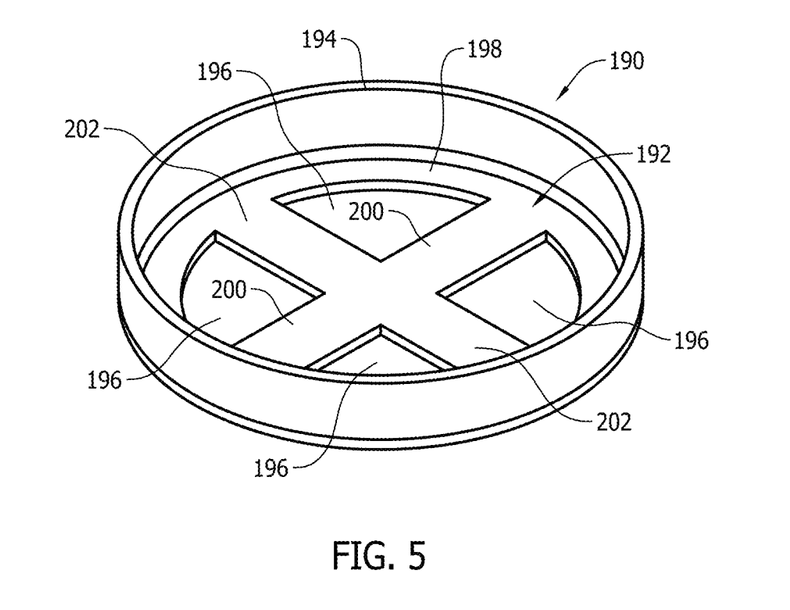
FIG. 5 is a perspective view of a second exemplary embodiment of a flexible current collector for the electrochemical energy storage device shown in FIG. 1.

FIG. 5 illustrates a second exemplary embodiment of a flexible current collector 190 that may be utilized as one or other or both of the current collectors 128, 130 (FIGS. 1-3) in the device 100 described above. The current collector 190 includes a generally flat and planar, disc-shaped body 192 extending in a first plane, and a connector element 194 extending as a cylindrical flange or rim that is out of plane to the body 192. In the example shown in FIG. 5, the connector element 194 extends as a right angle cylinder from the flat body 192, and in cross section the connector element 194 extends perpendicularly to the flat body 192. Unlike the collector 180 (FIG. 4), the flat body 192 in the example shown is discontinuous and includes four pointed internal openings, apertures, or holes 196 extending through it.

The openings 196 are equally sized and shaped in the example shown, and the body 192 generally has an annular outer portion 198 and two straight bands 200, 202 intersecting at the center of the body 192 in the configuration of a cross. Each opening 196 has two straight sides culminating at a point near the center of the body 192 and an arcuate or curved side that is spaced from the connector element 194 extending around the periphery of the body 192. While an exemplary shape and number of openings 196 has been described, variations are possible. Other numbers of openings 196 can alternatively be provided, and one or more of the openings 196 may have respectively different shapes instead of uniform shape in the example shown in FIG. 5.

By virtue of the openings 196, when the current collector 190 is used as one of the collectors 128 or 130 in the device 100 the electrolyte solution can flow through the body 192.

Figure 6:
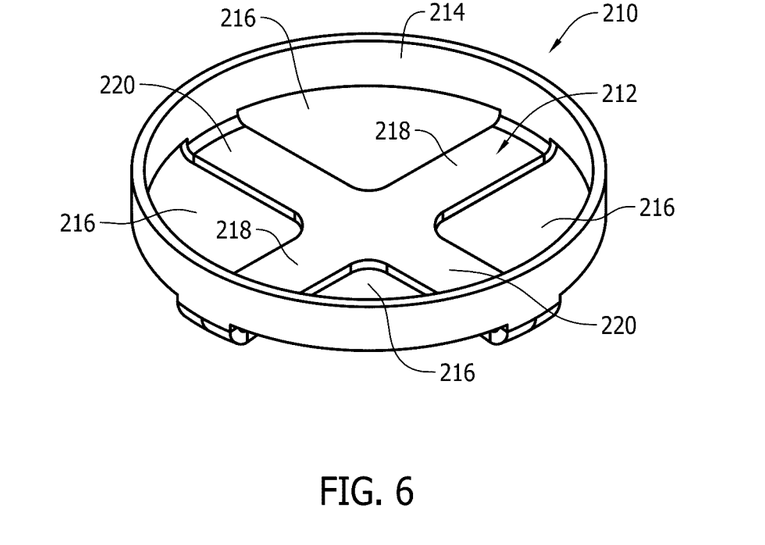
FIG. 6 is a perspective view of a third exemplary embodiment of a flexible current collector for the electrochemical energy storage device shown in FIG. 1.

FIG. 6 illustrates a third exemplary embodiment of a flexible current collector 210 that may be utilized as one or other or both of the current collectors 128, 130 (FIGS. 1-3) in the device 100 described above. The current collector 210 includes a generally flat and planar, disc-shaped body 212 extending in a first plane, and a connector element 214 extending as a cylindrical flange or rim that is out of plane to the body 212. In the example shown in FIG. 6, the connector element 214 extends as a right angle cylinder from the flat body 212, and in cross section the connector element 214 extends perpendicularly to the flat body 212. Unlike the collector 180 (FIG. 4), the flat body 212 in the example shown is discontinuous and includes four pointed internal openings, apertures, or holes 216 extending through it.

The openings 216 are equally sized and shaped in the example shown, and the body 212 generally includes two straight bands 218, 220 intersecting at the center of the body 212 in the configuration of a cross. Each opening 196 has two straight sides a rounded intersection near the center of the body 212 and an arcuate or curved side extends out of plane of the body 212 and into a portion of the connector element 214 extending around the periphery of the body 212. While an exemplary shape and number of openings 216 has been described, variations are possible. Other numbers of openings 216 can alternatively be provided, and one or more of the openings 216 may have respectively different shapes instead of uniform shape in the example shown in FIG. 6.

By virtue of the openings 216, when the current collector 210 is used as one of the collectors 128 or 130 in the device 100 the electrolyte solution can flow through the body 212 and portions of the connector element 214 where the openings 216 reside.

Figure 7:
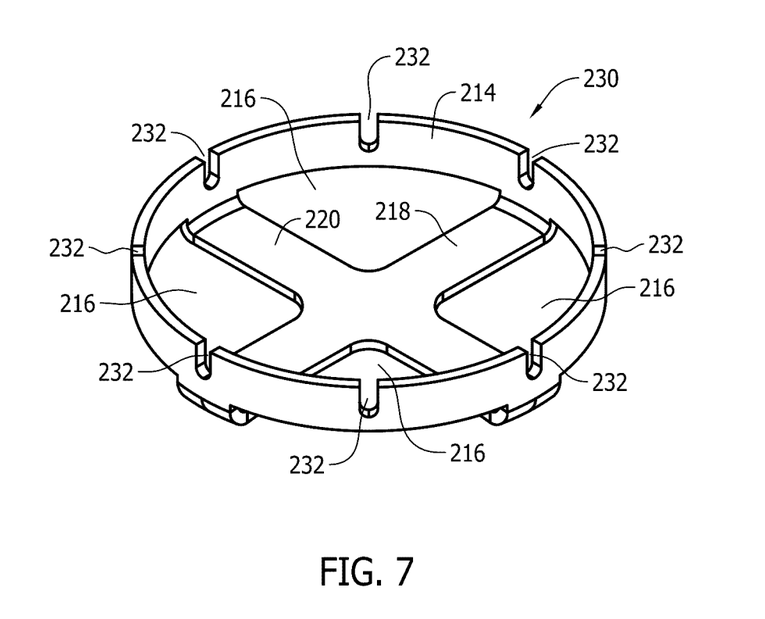
FIG. 7 is a perspective view of a fourth exemplary embodiment of a flexible current collector for the electrochemical energy storage device shown in FIG. 1.

FIG. 7 illustrates a fourth exemplary embodiment of a flexible current collector 230 that is similar to the collector 210 (FIG. 6) but further includes a number of openings 232 formed as slots extending from a distal ends of the connector element 214 in a perpendicular orientation with respect to the body 212. In the example of FIG. 7, eight openings 232 are shown that each extend 45° from one another around the circumference of the connector element 214. That is, adjacent openings 232 are located equidistantly from one another on the connector element 214. The openings 232 are further shown to extend only partly through the connector element 214. The openings 232 provide even more flexibility than the previously described current collectors 180, 190, and 210. Portions of the connector element 214 between the openings 232 may flex or bend independently or in combination as the device 100 is assembled.

While an exemplary shape and number of openings 232 has been described, variations are possible. Other numbers of openings 223 can alternatively be provided, and one or more of the openings 232 may have respectively different shapes instead of uniform shape in the example shown in FIG. 7.

As noted above, the flexible current collectors 180, 190, 210 and 230 may be used in combination on the same device 100. For example, the collector 180 may be used as the collector 128 and the collector 190 may be used as the collector 130. Alternatively, the collectors 128, 130 may be the same type of collector 180, 190, 210 and 230 utilized as a pair. Moreover, while flexible collectors are described on each end of the jelly roll storage element 104 in the device 100, only one of them may be utilized in contemplated embodiments. That is, one or the other of the current collectors 128, 130 may be utilized, but not both, while still achieving at least some of the benefits described.

Figure 9:
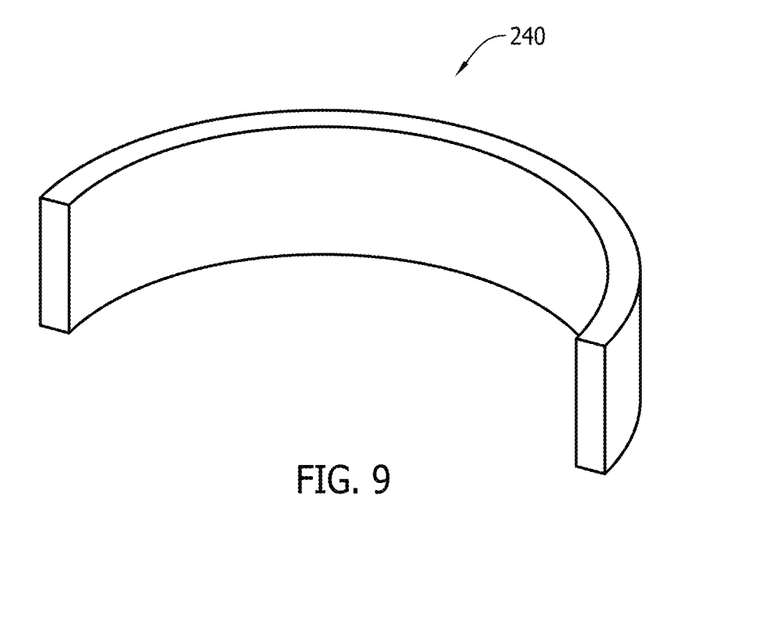
FIG. 9 is a second sectional view of a second exemplary embodiment of a sealing member for the electrochemical energy storage device shown in FIG. 1.

FIG. 9 illustrates another sealing member 240 that may be used alternatively to the sealing member 160 (FIGS. 2 and 8). Comparing FIGS. 8 and 9, it is seen that the sealing member 240 includes only the cylindrical wall portion 162. The sealing member 240 does not include the overhanging annular ledge 164 that the sealing member 160 includes. The sealing element 240 has a simpler construction than the sealing member 160 and may realize cost savings in the fabrication of the device 100 when used. Either sealing member 160 or 240 may be fabricated from known materials such as rubber or plastic according to known techniques.

The benefits and advantages of the inventive concepts are now believed to have been amply demonstrated in view of the exemplary embodiments disclosed.

An embodiment of an electrochemical energy storage device has been disclosed including: an electrically conductive housing having opposed first and second ends; a cover coupled to one of the first and second ends; at least one energy storage element in the housing; and at least one flexible current collector comprising a planar body and a connector element extending out of plane from said body, the body establishing electrical contact with the energy storage element and the connector element establishing electrical contact with one of the housing and the cover.

Optionally, the energy storage element may be a jelly roll. The jelly roll may have a flat end. The body of the flexible current collector may be welded to the flat end.

The body of the at least one flexible current collector may have an outer periphery and the connector element may extend cylindrically around the outer periphery. The body of the at least one flexible current collector may be continuously formed without an opening therethrough, or with at least one opening extending therethrough. The at least one opening may include at least one straight side and an arcuate side. The at least one opening may include first and second straight sides culminating at a point. The at least one opening may include a plurality of openings. The plurality of openings may be equally spaced form one another. The plurality of openings may include at least four openings.

As other options, at least one of the body and the connector element of the at least one flexible current collector may be formed with at least one opening. Both of the body and the connector element of the at least one flexible current collector may be formed with at least one opening. The at least one opening may extend partly in the body and partly in the connector element of the at least one flexible current collector.

As still another option, the connector element may be formed with at least one opening. The at least one opening may include a plurality of openings. At least one of the plurality of openings may include a slot extending perpendicular to the plane of the body. The plurality of openings may be equally spaced form one another. The plurality of openings may include at least eight openings.

The housing may be a metal can fabricated from one of a steel and aluminum. The cover may be electrically conductive. The body may have an outer periphery and the connector element may extend cylindrically around the outer periphery. The electrochemical energy storage device may also include a sealing member, the sealing member including a cylindrical wall portion surrounding the connector element. The sealing member may also include an overhanging annular flange. The cover may be formed with a stepped outer surface. The cover may be formed with a hollow interior cavity.

The housing may include a sidewall extending between the first and second ends, and the sidewall having at least one restricted section. The restricted section may compress the flexible current collector. The electrochemical energy storage device may also include a sealing element, with the restricted section compressing the sealing element.

The device may be an electric double layer capacitor (EDLC) device.

Another embodiment of an electrochemical energy storage device has been disclosed including: an electrically conductive housing having a first end, a second end and a sidewall between the first and second end; at least one energy storage element in the housing and internal to the sidewall; and a first flexible current collector comprising a planar body and a connector element extending cylindrically around said body, the body establishing electrical contact with the at least one energy storage element and the connector element establishing electrical contact with the sidewall of the housing.

Optionally, the energy storage element may be a jelly roll. The jelly roll may include a flat end, and the body of the collector element may be attached to the flat end. The body of the flexible contact current collector may be welded to the flat end. At least one of the base and the connector element may be formed with at least one opening. Both of the base and the connector element may be formed with at least one opening. Each of the base and the connector element may be formed with a plurality of openings. The sidewall may include a restricted section, the restricted section in contact with the connector element.

The electrochemical energy storage device may include an electrically conductive cover, and a second flexible current collector comprising a planar body and a connector element extending cylindrically around said body, the body establishing electrical contact with the at least one energy storage element and the connector element establishing electrical contact with the conductive cover. The electrochemical energy storage element may further include a sealing member, the sealing member surrounding the connector element and electrically isolating the conductive cover from the conductive housing. The device may be an electric double layer capacitor (EDLC) device.

Another embodiment of an electrochemical energy storage device has been disclosed including: an electrically conductive housing having a first end, a second end and a sidewall between the first and second end, the first end and the sidewall collectively defining a receptacle; at least one energy storage element in the receptacle, the energy storage element comprising a jelly roll; a first flexible current collector establishing electrical contact between the jelly roll and the sidewall; an electrically conductive cover sealing coupled to one of the first and second ends; and a second flexible current collector establishing electrical contact between the jelly roll and the electrically conductive cover; wherein each of the first flexible current collector and the second flexible current collector comprises a body and a cylindrical connector element extending around the body.

Optionally, the sidewall may include a first restricted section and a second restricted section, each restricted section facilitating an electrical connection of each respective first flexible current collector and second flexible current collector. The electrochemical energy storage device may further include a sealing element surrounding the second flexible current collector, and one of the first and second restricted sections may compress the sealing member. At least one of the base and the connector element of one of the first and second flexible current collectors may be formed with at least one opening. Both of the base and the connector element of one of the first and second flexible current collectors may be formed with at least one opening. Each of the base and the connector element of one of the first and second flexible current collectors may be formed with a plurality of openings. The device may be an electric double layer capacitor (EDLC) device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electrochemical energy storage device comprising:
   an electrically conductive housing having opposed first and second ends;
   a cover coupled to one of the opposed first and second ends;
   at least one energy storage element in the electrically conductive housing; and
   at least one flexible current collector comprising a planar body having an outer periphery and a connector element extending from the outer periphery and out of plane from said planar body, the planar body establishing electrical contact with the at least one energy storage element and the connector element establishing electrical contact with one of the electrically conductive housing and the cover, wherein the connector element is formed with at least one opening.

2. The electrochemical energy storage device of claim 1, wherein the energy storage element comprises a jelly roll.

3. The electrochemical energy storage device of claim 2, wherein the jelly roll has a flat end.

4. The electrochemical energy storage device of claim 3, wherein the planar body of the flexible current collector is welded to the flat end.

5. The electrochemical energy storage device of claim 1, wherein the outer periphery is circular and wherein connector element extends cylindrically around the outer periphery.

6. The electrochemical energy storage device of claim 1, wherein the planar body of the at least one flexible current collector is formed with at least one opening extending therethrough.

7. The electrochemical energy storage device of claim 6, wherein the at least one opening includes at least one straight side and an arcuate side.

8. The electrochemical energy storage device of claim 7, wherein the at least one opening includes first and second straight sides culminating at a point.

9. The electrochemical energy storage device of claim 6, wherein the at least one opening includes a plurality of openings.

10. The electrochemical energy storage device of claim 9, wherein the plurality of openings are equally spaced form one another.

11. The electrochemical energy storage device of claim 9, wherein the plurality of openings comprises at least four openings.

12. The electrochemical energy storage device of claim 1, wherein the at least one opening extends partly in the planar body and partly in the connector element of the at least one flexible current collector.

13. The electrochemical energy storage device of claim 1, wherein the at least one opening includes a plurality of openings.

14. The electrochemical energy storage device of claim 13, wherein at least one of the plurality of openings comprises a slot extending perpendicular to the plane of the planar body.

15. The electrochemical energy storage device of claim 13, wherein the plurality of openings are equally spaced form one another.

16. The electrochemical energy storage device of claim 13, wherein the plurality of openings comprises at least eight openings.

17. The electrochemical energy storage device of claim 1, wherein the electrically conductive housing comprises a metal can fabricated from one of a steel and aluminum.

18. The electrochemical energy storage device of claim 1, wherein the cover is electrically conductive.

19. The electrochemical energy storage device of claim 18, wherein the connector element extends cylindrically around the outer periphery.

20. The electrochemical energy storage device of claim 19, further comprising a sealing member, the sealing member including a cylindrical wall portion surrounding the connector element.

21. The electrochemical energy storage device of claim 20, wherein the sealing member further includes an overhanging annular flange.

22. The electrochemical energy storage device of claim 18, wherein the cover is formed with a stepped outer surface.

23. The electrochemical energy storage device of claim 18, wherein the cover is formed with a hollow interior cavity.

24. The electrochemical energy storage device of claim 1, wherein the electrically conductive housing comprises a sidewall extending between the first and second ends, and the sidewall having at least one restricted section.

25. The electrochemical energy storage device of claim 24, wherein the restricted section compresses the flexible current collector.

26. The electrochemical energy storage device of claim 24, further comprising a sealing element, the restricted section compressing the sealing element.

27. The electrochemical energy storage device of claim 1, wherein the device is an electric double layer capacitor (EDLC) device.

28. An electrochemical energy storage device comprising:
   an electrically conductive housing having a first end, a second end and a sidewall between the first and second end;
   at least one energy storage element in the electrically conductive housing and internal to the sidewall; and
   a first flexible current collector comprising a planar body and a connector element extending cylindrically around said planar body, the planar body establishing electrical contact with the at least one energy storage element and the connector element establishing electrical contact with the sidewall of the electrically conductive housing, wherein the connector element is formed with at least one opening.

29. The electrochemical energy storage device of claim 28, wherein the energy storage element comprises a jelly roll.

30. The electrochemical energy storage device of claim 29, wherein the jelly roll has a flat end, the planar body of the collector element being attached to the flat end.

31. The electrochemical energy storage device of claim 30, wherein the planar body of the flexible contact current collector is welded to the flat end.

32. The electrochemical energy storage device of claim 28, wherein the planar body is formed with at least one opening.

33. The electrochemical energy storage device of claim 32, wherein each of the planar body and the connector element are formed with a plurality of openings.

34. The electrochemical energy storage device of claim 28, wherein the sidewall includes a restricted section, the restricted section in contact with the connector element.

35. The electrochemical energy storage device of claim 28, further comprising an electrically conductive cover, and a second flexible current collector comprising a planar body and a connector element extending cylindrically around said planar body, the planar body establishing electrical contact with the at least one energy storage element and the connector element establishing electrical contact with the electrically conductive cover.

36. The electrochemical energy storage element of claim 28, further comprising a sealing member, the sealing member surrounding the connector element and electrically isolating the electrically conductive cover from the electrically conductive housing.

37. The electrochemical energy storage device of claim 28, wherein the device is an electric double layer capacitor (EDLC) device.

38. An electrochemical energy storage device comprising:
   an electrically conductive housing having a first end, a second end and a sidewall between the first and second end, the first end and the sidewall collectively defining a receptacle;
   at least one energy storage element in the receptacle, the energy storage element comprising a jelly roll;
   a first flexible current collector establishing electrical contact between the jelly roll and the sidewall;
   an electrically conductive cover sealingly coupled to one of the first and second ends; and
   a second flexible current collector establishing electrical contact between the jelly roll and the electrically conductive cover;
   wherein each of the first flexible current collector and the second flexible current collector comprises a body and a cylindrical connector element extending around the body, and wherein the cylindrical connector element of at least one of the first flexible current collector and the second flexible current collector is formed with at least one opening.

39. The electrochemical energy storage device of claim 38, wherein the sidewall includes a first restricted section and a second restricted section, each restricted section facilitating an electrical connection of each respective first flexible current collector and second flexible current collector.

40. The electrochemical energy storage device of claim 39, further comprising a sealing element surrounding the second flexible current collector, and one of the first and second restricted sections compressing the sealing member.

41. The electrochemical energy storage device of claim 39, wherein the body of at least one of the first flexible current collector and second flexible current collector is formed with at least one opening.

42. The electrochemical energy storage device of claim 40, wherein both of the body and the connector element of at least one of the first flexible current collector and second flexible current collector are formed with at least one opening.

43. The electrochemical energy storage device of claim 42, wherein each of the body and the connector element of at least one of the first flexible current collector and second flexible current collector are formed with a plurality of openings.

44. The electrochemical energy storage device of claim 38, wherein the device is an electric double layer capacitor (EDLC) device.

* * * * *